United States Patent [19]
Dowst

[11] Patent Number: 5,467,408
[45] Date of Patent: Nov. 14, 1995

[54] BALL POINT WRITING QUALITY ANALYSIS

[75] Inventor: William P. Dowst, Reading, Mass.

[73] Assignee: The Gillette Company, Boston, Mass.

[21] Appl. No.: 232,522

[22] Filed: Apr. 22, 1994

[51] Int. Cl.⁶ .................................................. G06K 9/46
[52] U.S. Cl. ........................................ 382/112; 382/168
[58] Field of Search ................................ 382/18, 51, 53, 382/1; 356/91

[56] References Cited

U.S. PATENT DOCUMENTS

| | | | |
|---|---|---|---|
| 4,695,884 | 9/1987 | Anastassion | 382/51 |
| 4,847,912 | 7/1989 | Tanaka | 382/18 |
| 4,862,510 | 8/1989 | Duncan et al. | 382/8 |
| 5,073,954 | 12/1991 | Van Tyne | 382/18 |
| 5,133,622 | 7/1992 | Weideman | 382/18 |
| 5,144,566 | 9/1992 | Anderson | 382/18 |
| 5,212,741 | 5/1993 | Barski | 382/18 |
| 5,321,769 | 6/1994 | Takahashi | 382/18 |

FOREIGN PATENT DOCUMENTS

0533123A1  3/1993  European Pat. Off. ....... G01D 15/16

*Primary Examiner*—Yon J. Couso
*Attorney, Agent, or Firm*—Owen J. Meegan; Aubrey C. Brine; Donal B. Tobin

[57] ABSTRACT

A method of analyzing the writing quality of a ball point pen for ink laydown, blobbing, and degree of inconsistency employs a computer and an image analysis software package capable of assembling a pixel gray level distribution known as a histogram. The distribution of pixel gray value for a writing sample is manipulated and analyzed, the values then being compared to a range of pre-established values.

5 Claims, 8 Drawing Sheets

BALL POINT WRITING QUALITY ANALYSIS

BACKGROUND OF THE INVENTION

The present invention relates to the measurement of ball pen writing quality, and more particularly to the employment of a computerized/image system for analysis of ball point pen writing.

In the manufacture of ball point pens, writing quality generally depends on the maintenance of relatively tight tolerances during the precision manufacturing processes. Presently the test for manufacturing process quality is achieved by having a writing sample prepared by a cam driven machine, after which a human grader rates the sample and the grader assigns values which range from acceptable to most severe for each of the rated categories. The traces are visually examined for line quality which may generally be divided into the three measurements of ink laydown, degree of blobbing and degree of line inconsistency. Ink laydown, which is generally designated as the milligrams of ink dispensed per 185 feet of written line, is now measured periodically in a manual fashion after pen assembly to give an indication of the tolerances achieved in the point making operation.

Additionally, in the area of research and development, while visual examination as set forth above has proved to be somewhat. successful, as product development becomes increasingly more customer driven, the ability to cost effectively determine consumers perception of writing quality becomes more important and there is a need to provide a method of writing analysis which is more comprehensive, repeatable and cost effective to provide useful correlation between a sample and the consumers' perception of writing quality.

With the advent of advanced fully featured computer vision/image analysis capability-available at moderate cost for PC based systems, the number of applications having favorable cost benefit ratios in research process development and manufacturing has increased. Such applications are capable of providing improvements in research efficiencies, (for instance the rapid determination of number of facial hairs per square inch with a quantitative data on hair size and shape), in manufacturing efficiency, (such as rejection of fewer good parts and assemblies), and in any other situation in which analysis of visual images is important. The area of writing quality metrics therefore, is one having a great potential for such application.

It is therefore an object of the present invention to improve the analysis of ball pen writing quality by the application of vision system technology.

A further object of the invention is to replace the relatively subjective human sample grading of a ball point writing sample with a relatively objective machine grading.

Still a further objective of the invention is to employ a histogram comprising a pixel image of a writing sample to measure the rate of ink laydown, degree of blobbing, and degree of line inconsistency enabling comparison with pre-established values corresponding to qualities.

SUMMARY OF THE INVENTION

The above objects and other objectives which will become apparent as the description proceeds are achieved by providing a method of measuring ball point pen writing quality which includes the steps of providing an ink writing sample from the pen and providing computer imaging system for defining the ink system and background as a histogram formed of a plurality of pixels. The values derived from the histogram formed from the digitized image of the writing sample may be compared with a range of values derived from samples exhibiting acceptable writing quality.

The histogram is formed by digitizing the video image into a pixel grid and then assigning each pixel a gray value from zero, which is pure black, to 256, which is pure white, and the pixels at each gray value are summed to produce the histogram having the values of zero and 256 along the abscissa of the histogram and number of pixels along the histogram ordinate.

To measure the amount of ink laydown, a median gray value may be visually observed as the location of the ink pixel peak which is the peak closest to the zero value or may be calculated, for example, by finding the numerical slope of the histogram at all gray value points and a value of one is assigned to that gray value point if the slope is greater than one and a value of minus one is assigned to that gray level point if the slope is less than zero. The positive ones and negative ones may be displayed in a separate array identifying the median gray value as the first positive to negative transition which occurs in the array. The median gray value is then input to a pre-established correlation enabling prediction of ink laydown.

The writing consistency of the sample is generally measured by measuring the peak toward the zero value and the distance from the peak to the trough between that peak and an adjacent peak and taking a ratio between the value of the height of the ink peak and the distance from the height of the ink peak. The ratio if near one, generally indicates a sample exhibiting good writing consistence while a sample exhibiting a poor consistency will generally have value considerably higher than one.

In measuring the "blobbing" of ink material in a sample by determining the slope of the ink peak toward the zero side of the histogram and calculating where the slope line intersects the abscissa. The number of pixels from that point to the zero point is determined and the number divided into the total number of pixels in the histogram to give the fraction of image area covered with blobs of ink material.

BRIEF DESCRIPTION OF THE DRAWING

Reference is made to the accompanying drawing in which the novel features and advantages of the. invention will be apparent, wherein.

Figure 1:
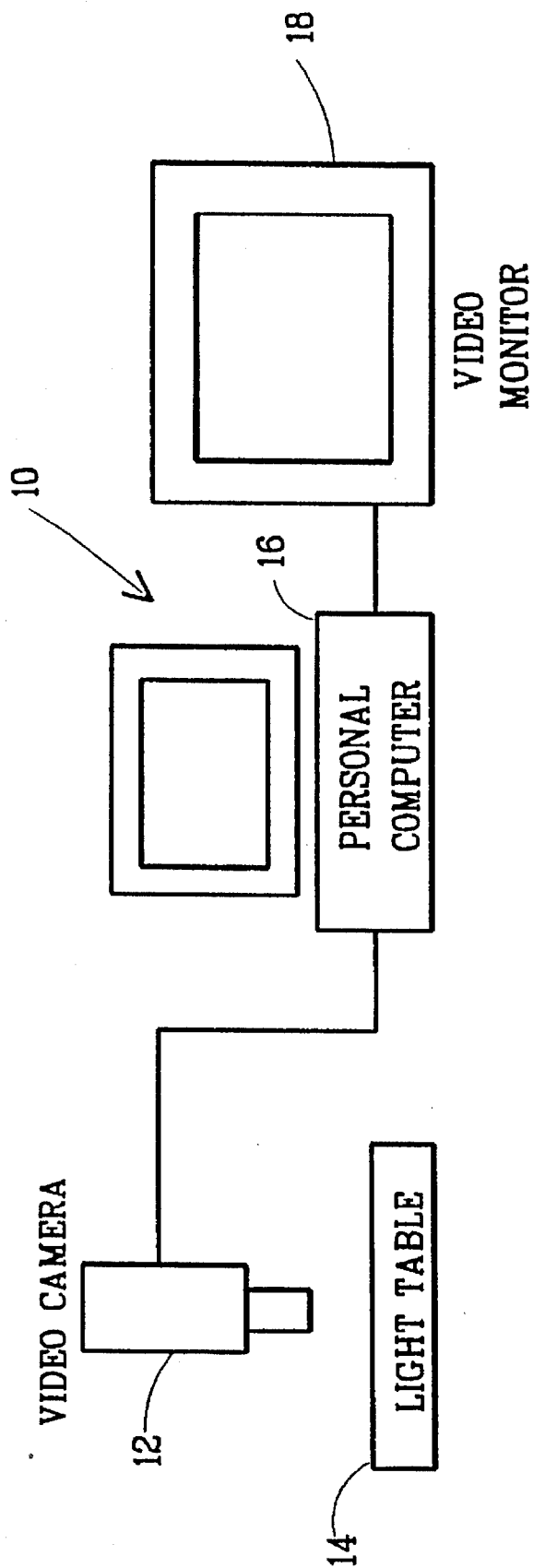
FIG. 1 is a schematic view showing a vision system apparatus employed in achieving the method of the present invention.
Figure 9:
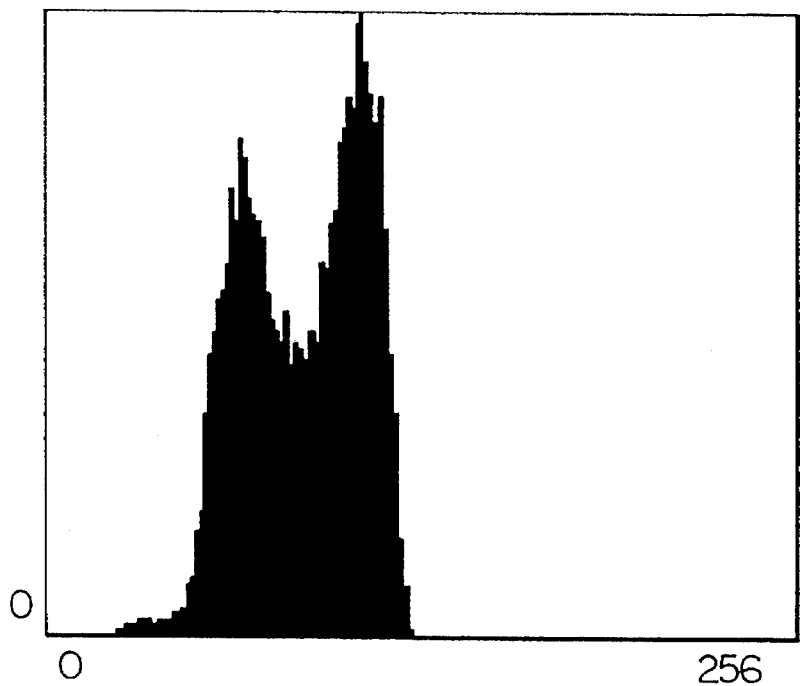
FIG. 9 shows a histogram wherein several ink "blobs"
Figure 10:
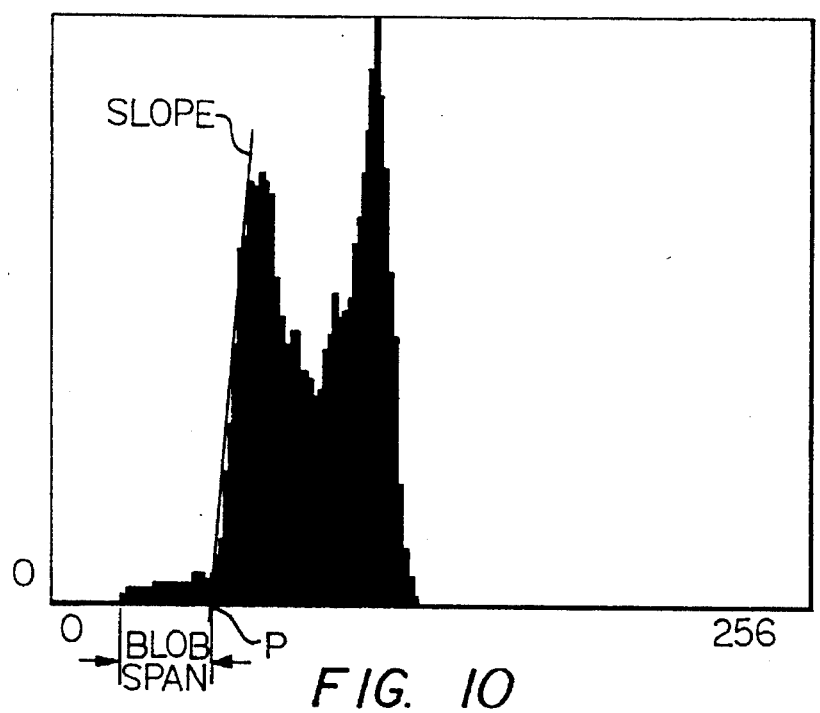
Figure 11:
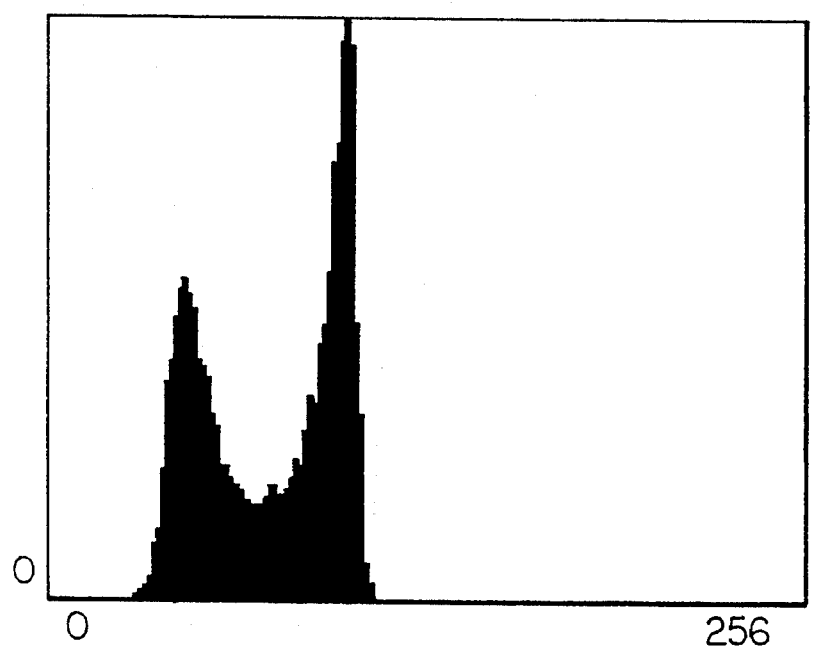
Figure 12:
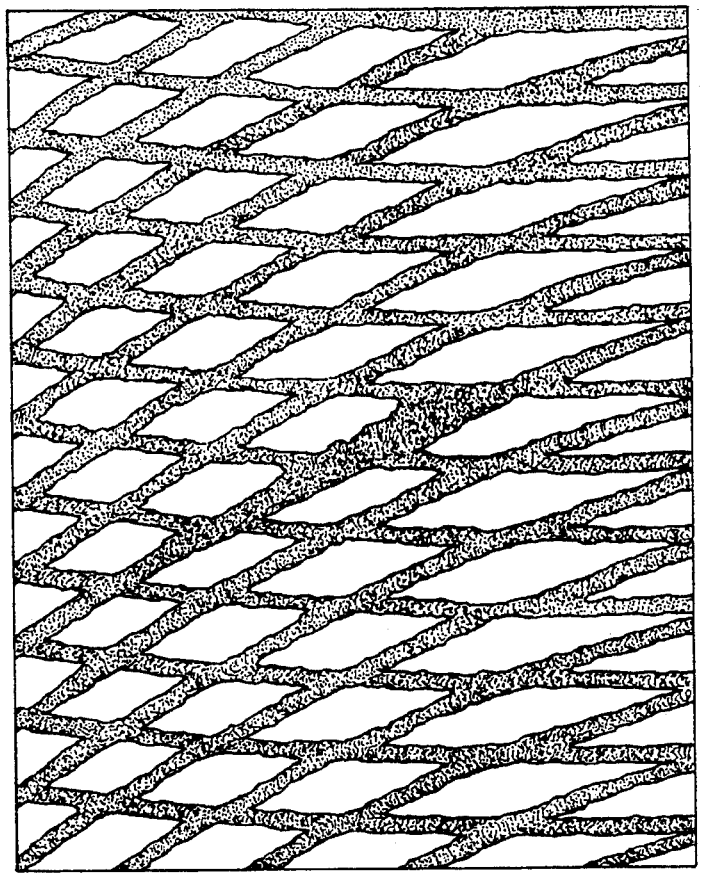
Figure 13:
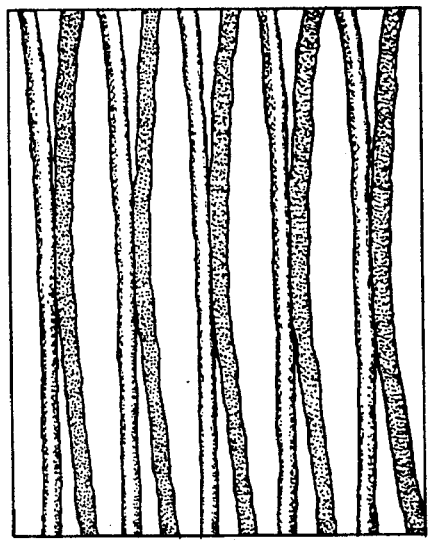
Figure 14:
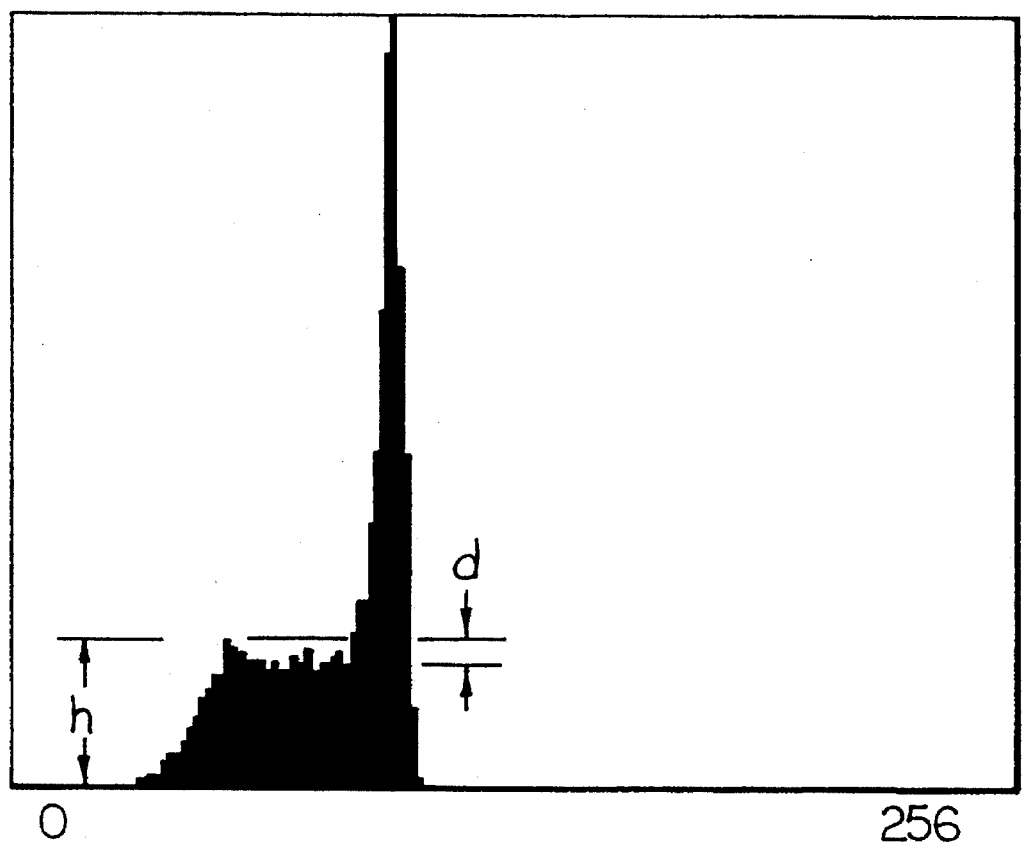

have occurred in the sample viewed by the vision system apparatus of FIG. 1;

FIG. 10 shows a histogram similar to that of FIG. 9;

FIG. 11 shows a histogram of a writing sample corresponding to one having good line consistency and being blob free;

FIG. 12 is a representation of a writing sample showing a "blob" which has occurred during the writing process;

FIG. 13 is a representation of a writing sample showing line splits (inconsistency); and FIG. 14 is a histogram of a writing sample having line splits (inconsistency) as in FIG. 13.

DESCRIPTION OF THE PREFERRED EMBODIMENT

In FIG. 1 there is shown in schematic a vision system apparatus 10 comprising a video camera 12 and light table 14, the video camera being connected to a PC 16 provided with a computer program capable of assembling a pixel gray level distribution better known as a histogram. A video monitor 18 is connected to the PC in the usual manner to complete the apparatus.

The video camera 12 for example may be a Javelin MOS solid state CCD video camera with a Computar TV F1.4 75 mm. lens and C mount adaptor such as, a 10 mm. adaptor, manufactured by Javelin Electronics of Japan. The table 14 may be, for example, one provide by Newport Corporation of Fountain Valley, Calif., which allows for flat placement of the writing sample and mounting of the camera at an adjustable height above the sample. A high frequency sample light source (not shown) such as Steady Lite Model 13, manufactured by Stocker & Yale of Beverly, Mass., may be employed with the light table 14.

The personal computer is an IBM compatible or the like with a model CFG "frame-grabber" board having 640×480 pixel resolution, manufactured by Imaging Technology, Inc., of Woburn, Mass.

The software package employed with the PC was a compatible image analysis software package sold under the trade name OPTIMAS from Bioscan, Inc., of Edmonds, Wash., capable of assembling a pixel gray level distribution to form a histogram. However, any PC image analysis software package, e.g. Image Analyst from Automatix, Inc., of Billerica, Mass., or any turn key imaging system, for example, an Optimax VHR system which may be purchased from Analytical Measuring Systems of Cambridge, United Kingdom, and capable of assembling a pixel gray level distribution, may be employed.

Figure 2:
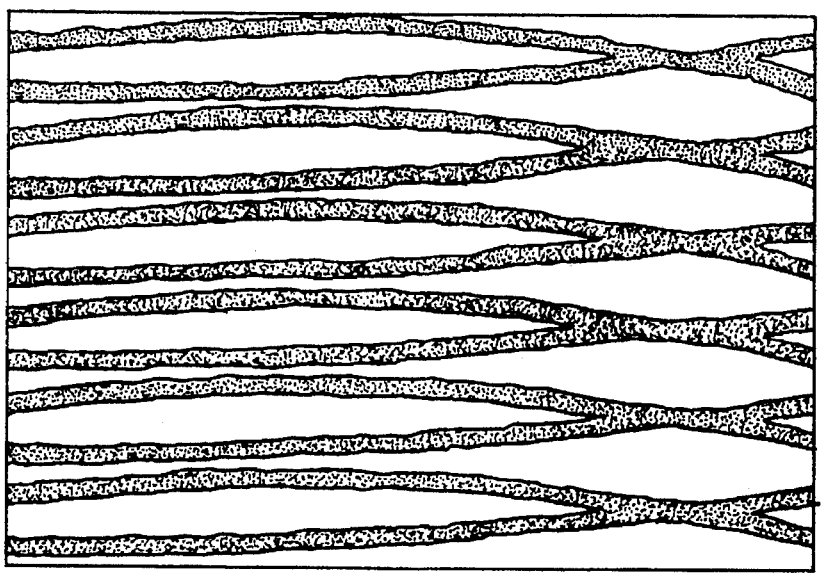
FIG. 2 is a representation of a typical writing sample obtained from the apparatus of FIG. 1.
Figure 3:
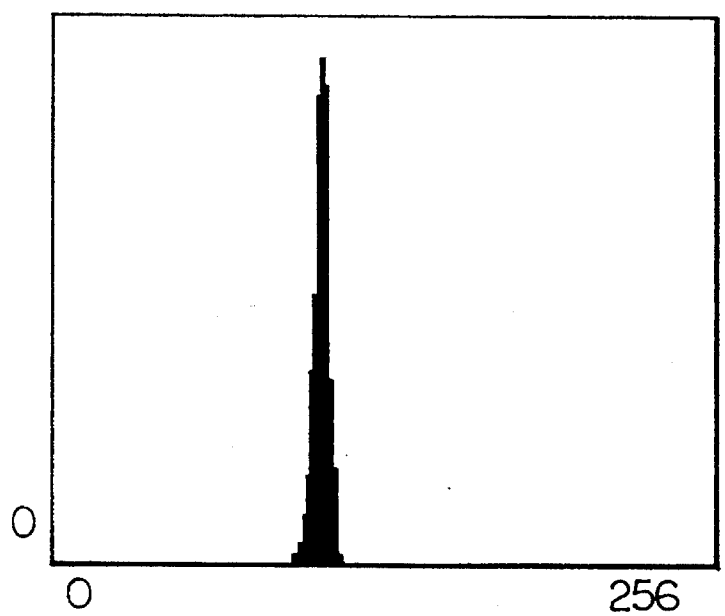
FIGS. 3, 4 and 5 show typical scans of various portions of a sample prepared from a sample of the type shown in FIG. 2.
Figure 4:
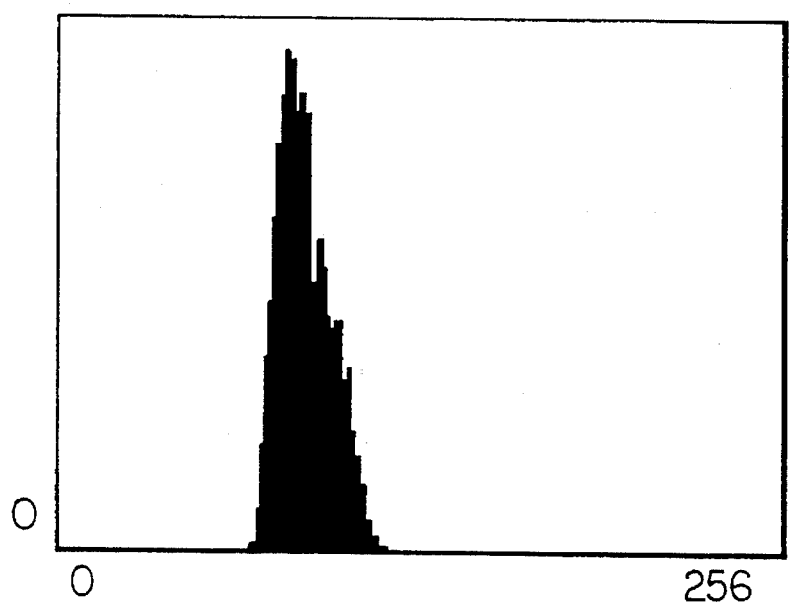
Figure 5:
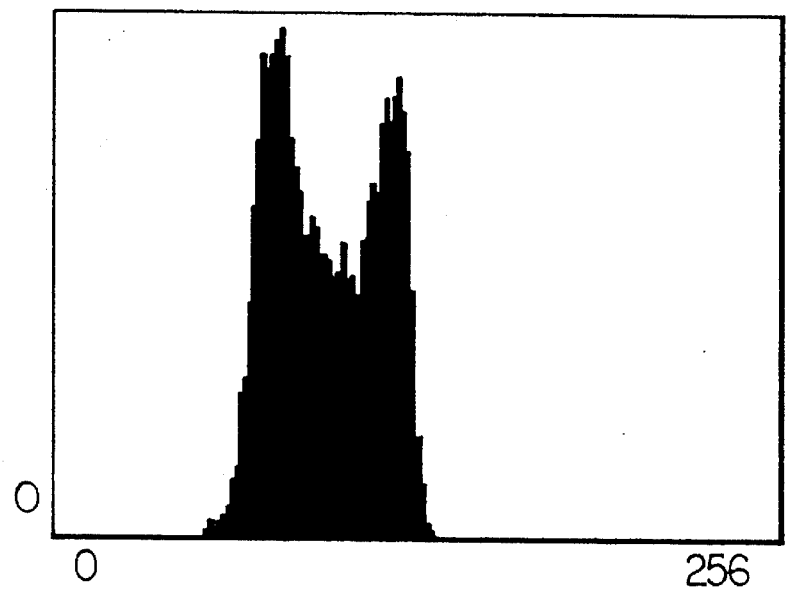

Referring now to FIGS. 2 through 5, a writing sample as shown in FIG. 2 is prepared employing an automatic writing system such as that manufactured by Hartley, or by hand, from which the histograms shown in FIGS. 3, 4 and 5 are generated.

As is known to those familiar with the art, a histogram is simply a distribution of pixel gray values corresponding to a digitized acquired image, ranging from zero (pure black) to 256 (pure white). Every pixel in the image is assigned a gray value from zero to 256, and a tally is performed to determine the number of pixels, measured along the ordinate at each gray level to produce the histogram. Summing the number of pixels at every gray level will therefore result in the total number of pixels making up the original image.

For example, the histogram of FIG. 3 results from a scan of a paper region only, the distribution being narrow and centered around the value near mid-range.

The histogram of FIG. 4 resulted from a scan of an ink region only and as will be observed the distribution is wider and shifted toward the black end of the spectrum.

The histogram of FIG. 5 resulted from a scan of the entire image and it will be noted that two characteristic peaks are present, the leftmost corresponding to the ink and the rightmost corresponding to the paper which is typical of a histogram generated from a scan of an area of perhaps one square inch containing both a paper and ink distribution.

Generally the raw histogram distributes electronic noise and therefore before any measurements of writing quality take place the histogram is smoothed by application of an algorithm which performs a "moving window" average on the histogram. That is, for each histogram gray value, a smoothed pixel value is obtained by averaging the pixel values over several gray values greater and less than the gray values in questions, a new smoothed histogram array is then produced similar to the original, but with better definition of the periphery of the histogram curve.

Figure 6:
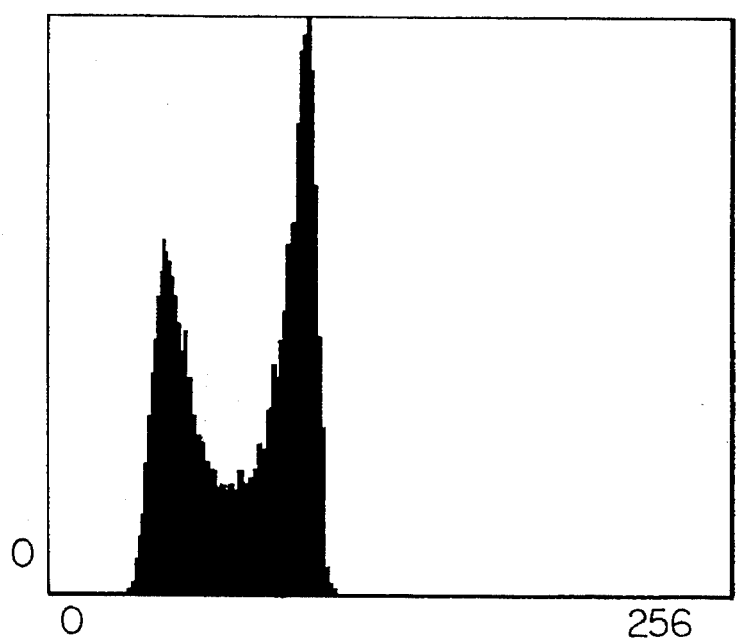
FIG. 6 shows a histogram of a good writing sample taken from the vision system shown in FIG. 1.
Figure 7:
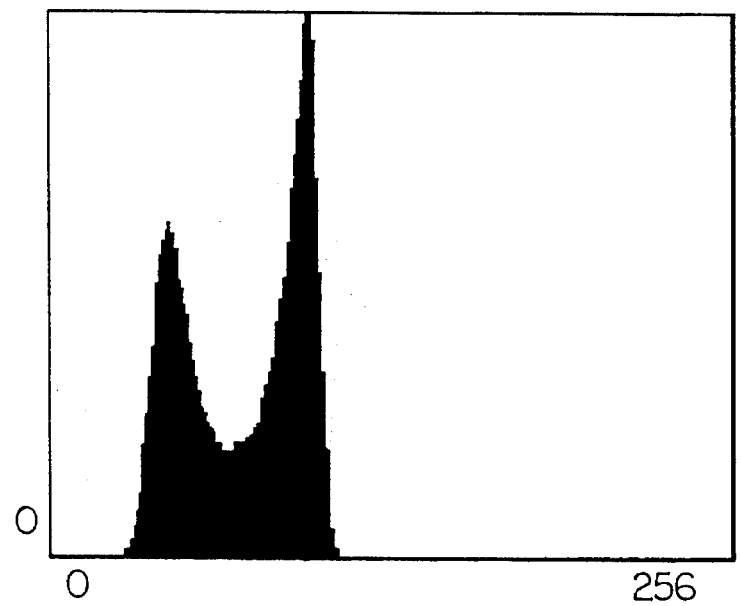
FIG. 7 shows the histogram of FIG. 6 having been subjected to a "smoothing" process.

Referring to FIGS. 6 and 7, a raw, or initial histogram is shown in FIG. 6 which contains various small peaks and valleys caused by electronic noise, as set forth above. In FIG. 7, the same histogram is shown having the surface smoothed such that measurements of writing quality can be obtained, as will be described below.

In measuring ink laydown, it should be remembered that the histogram for the writing instrument line sample exhibits a bimodal, or double peaked, characteristic. The first peak, closest to gray value zero (black) consists of those pixels making up the written line. The second peak, shifted toward the higher gray values (white), consists of the paper pixels.

Figure 8:
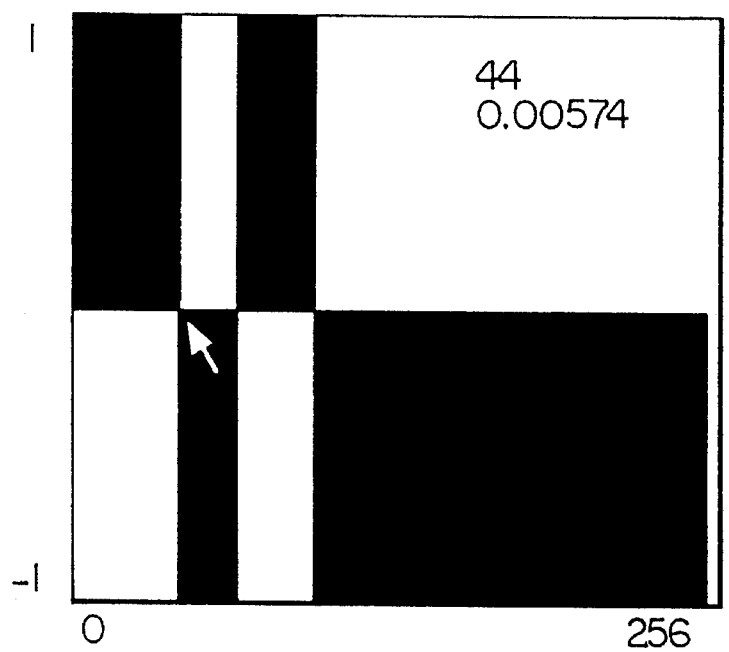
FIG. 8 shows the median gray level of the histogram of FIGS. 6 and 7 by indicating inflection points in the histogram as transitions between negative and positive slope values.

In order to measure ink laydown a value for a writing sample must be determined which for the purpose of the present invention will be hereinafter referred to as the "median gray value". This value may be visually determined by locating the value along the histogram abscissa at which the leftmost (closest to 0) ink peak occurs, or may be calculated by, for example, obtaining the numerical slope of the smoothed histogram at all gray value points. If the slope is greater than zero, that gray value may be assigned a positive one. If the slope is less than zero that gray value point may be assigned a negative one. The positive and negative ones may be placed in a separate data array and this array may be plotted as shown in FIG. 8. Inflection points in the original histogram show up as transitions between the negative and positive one values in this data. The median gray value is determined by the program as the first positive to negative inflection point (closest to the gray value zero), which is designated by the arrow in FIG. 8.

Thus for a given ink composition, the histogram gray value corresponding to the ink peak pixel maximum or as described the median gray level, may be compared with that values of pre-established range, which is generally in the area of seven to 20 milligrams per 186 feet.

To determine blobbing (as shown in FIG. 12) in the ink sample under consideration reference should be made to FIGS. 9 and 10 containing histograms demonstrating an ink line wherein blobbing has occurred. It will be noted that the blobbing appears on the histogram as a "tail" or a clump of pixels, connected to the ink peak at the leftmost (blackest) side.

The blobbing is generally rated by beginning about halfway up the ink peak, and tracing down the left slope of the ink peak and thereafter calculating where this slope would intersect the axis or in other words where it would intersect the "blob tail"(see FIGS. 10 and 11). The X intercept or point P as shown in FIGS. 10 and 11 is called the blob threshold, and all the pixels to the left of this threshold are considered to be associated with blobs in the digitized writing sample. The first measurement, called blob area, is a tally of the number of pixels in the blob tail. This number when divided by the total number of pixels in the image gives the fraction of image area covered with the blobs.

The second measurement called blob span is the gray value width of the blob tail, from the blob threshold (point P) leftward. This measurement gives an indication of the relative size of the blobs. It has been found that larger blobs tend to appear quite dark, creating a wide blob tail stretching down into the black region of the histogram. FIG. 9 is typical of a writing sample with a number of blobs while FIG. 10 shows a writing sample in which a severe blob has occurred.

In employing the histogram as a measurement of line inconsistency such as the split lines shown in FIG. 13, reference should be had to FIG. 14 which demonstrates a line quality as shown in FIG. 13, and FIG. 11 which demonstrates a good writing sample exhibiting a bimodal characteristic. It has been found that for good writing quality, there are two definite peaks separated by a trough. In samples demonstrating inconsistent writing quality, the peaks are not separated by such a deep trough, and also the degree of inconsistency can be gauged by the relative depth of the trough compared with a good writing sample in determining writing consistency. Therefore, a calculation is made of the height of the ink peak h and the depth of the trough d relative to the peak height as showing FIGS. 11 and 14. A ratio of the height of the ink peak to the depth of the ink peak may be calculated and it has been found that a good writing sample will have an inconsistency value of near one while a sample exhibiting poor consistency will have a value considerably higher than one for example, the h to d value of the histogram of FIG. 11 is in the area of 1.5, while the h to d value of the histogram of FIG. 14 is approximately 5. However, it should be understood, as with each of the described measurements, that an "acceptable" value would depend entirely on the requirements of one employing the disclosed analysis.

While it is apparent that changes and modifications can be made within the spirit and scope of the present invention, it is my intention, however, only to be limited by the appended claims.

As my invention I claim:

1. A method of measuring ball point pen writing quality including the steps of:

preparing ink writing samples from a plurality of ball point pens having acceptable writing quality;

providing a computer imaging system;

transforming each ink writing sample and background into a histogram formed of a plurality of pixels by employing the computer imaging system to assign each pixel a gray value from zero which is pure black to 256 which is pure white and to sum the pixels of every gray value to produce a histogram having the values of zero and 256 along the abscissa and the number of pixels of each gray value along the ordinate, each of said histograms comprising a pair of peaks, the ink peak disposed toward the 0 value indicating the maximum pixel value of the ink and the second peak spaced from the ink peak toward the 256 value indicating the maximum pixel value of the background on which the ink sample is formed;

establishing a plurality of ranges of values derived from the histogram obtained from the acceptable writing sample;

preparing an ink writing sample from a ball point pen of unknown writing quality;

employing said computer imaging system to transform said ink writing sample from said ball point pen of unknown writing quality into a histogram formed of a plurality of pixels, each pixel being assigned a gray value from zero which is pure black to 256 which is pure white and to sum the pixels of every gray value to produce a histogram having values of zero and 256 along the abscissa and the number of pixels of each gray value along the ordinate, each of said histograms comprising a pair of peaks, the ink peak disposed toward the 0 value indicating the maximum pixel value of the ink and the second peak spaced from the ink peak toward the 255 value indicating the maximum pixel value of the background on which the ink sample is formed;

determining the slope of the ink peak toward the zero value side of each histogram by forming a line running from a point about halfway up the ink peak to the point of intersection with the abscissa, and calculating that point along the abscissa where the slope line intersects the abscissa;

determining the number of pixels from that point to the zero point of each histogram and dividing this number by the total number of pixels in each histogram to determine the fraction of image area covered with blobs of ink material in each histogram; and comparing the values derived from the histogram of the ball point pen of unknown writing quality with the range of values established from the acceptable writing samples to determine the acceptability of the ball point pen of unknown writing quality.

2. The method of claim 1 which further includes the steps of determining the median gray value for each of said samples by locating the maximum value of the ink peak along the abscissa of each of the histograms to determine ink laydown.

3. The method of claim 1 which further includes the steps of determining the median gray value by calculating, for example, the numerical slope of each of the histograms at all gray value points, assigning a value of one to that gray value point if the slope is greater than one and assigning a value of minus one to that gray level point if the slope is less than zero, and placing the positive ones and negative ones in a separate array;

identifying the median gray value as the first positive to negative transition occurs in said separate array, and comparing the values to determine acceptable ink laydown.

4. A method as set forth in claim 1 including the steps of taking a ratio between the value of the height of the ink peak and the distance from the height of the ink peak to the top of the trough between said ink peaks in each of said histograms to measure consistency of each of the writing samples.

5. The method of claim 1 wherein prior to comparing each said histogram with a writing sample histogram, each of the histograms is smoothed by averaging the pixel values over a plurality of gray values greater and less than the gray value at each histogram gray value, and thereafter producing a new histogram array similar to the original by employing those average values obtained, whereby each said newly produced histogram provides a histogram curve having improved definition.

* * * * *